United States Patent
Bitzi et al.

(10) Patent No.: US 10,358,320 B2
(45) Date of Patent: Jul. 23, 2019

(54) ELEVATOR BRAKE

(71) Applicant: Inventio AG, Hergiswil (CH)

(72) Inventors: Raphael Bitzi, Lucerne (CH); Tobias Meier, Besenbüren (CH)

(73) Assignee: INVENTIO AG, Hergiswil (CH)

( * ) Notice: Subject to any disclaimer, the term of this patent is extended or adjusted under 35 U.S.C. 154(b) by 295 days.

(21) Appl. No.: 15/512,580

(22) PCT Filed: Sep. 3, 2015

(86) PCT No.: PCT/EP2015/070152
§ 371 (c)(1),
(2) Date: Mar. 20, 2017

(87) PCT Pub. No.: WO2016/045934
PCT Pub. Date: Mar. 31, 2016

(65) Prior Publication Data
US 2017/0291793 A1    Oct. 12, 2017

(30) Foreign Application Priority Data

Sep. 24, 2014    (EP) ..................................... 14186211

(51) Int. Cl.
*B66B 1/32*        (2006.01)
*B66B 5/18*        (2006.01)
(Continued)

(52) U.S. Cl.
CPC .................. *B66B 1/32* (2013.01); *B66B 5/18* (2013.01); *B66B 9/00* (2013.01); *F16D 61/00* (2013.01);
(Continued)

(58) Field of Classification Search
CPC .... B66B 1/32; B66B 5/18; B66B 9/00; F16D 61/00; F16D 63/008; F16D 2121/20; F16D 2121/24; F16D 2125/585
See application file for complete search history.

(56) References Cited

U.S. PATENT DOCUMENTS 3,115,956 A * 12/1963 Trombetta ............... B66D 5/26
                                                      188/163
5,648,644 A *  7/1997 Nagel ....................... B66B 5/18
                                                      187/288
(Continued)

FOREIGN PATENT DOCUMENTS

CN            1491879 A     4/2004
CN          101200259 A     6/2008
(Continued)

*Primary Examiner* — Michael A Riegelman
(74) *Attorney, Agent, or Firm* — William J. Clemens; Shumaker, Loop & Kendrick, LLP (57) ABSTRACT

An elevator brake braking and holding an elevator car in an elevator system includes a first brake lining having a first actuating device and a second brake lining, which brake linings cause braking in interaction with a braking strip or brake disk. A second actuating device is associated with the second brake lining, and the second actuating device moves the second brake lining toward the first brake lining, if necessary, thus clamping and braking the braking strip or the brake disk between the second and first brake linings. The first actuating device moves the first brake lining toward the second brake lining to clamp and brake the braking strip or the brake disk between the first and second brake linings. The first and the second actuating device operate according to different principles of operation.

15 Claims, 5 Drawing Sheets

US 10,358,320 B2

Page 2

(51) Int. Cl.
*B66B 9/00* (2006.01)
*F16D 61/00* (2006.01)
*F16D 63/00* (2006.01)
*F16D 121/20* (2012.01)
*F16D 121/24* (2012.01)
*F16D 125/58* (2012.01)

(52) U.S. Cl.
CPC ........ F16D 63/008 (2013.01); *F16D 2121/20* (2013.01); *F16D 2121/24* (2013.01); *F16D 2125/585* (2013.01)

(56) References Cited

U.S. PATENT DOCUMENTS

| | | | | |
|---|---|---|---|---|
| 5,791,442 A * | 8/1998 | Arnold | ...................... | H01F 5/00 188/138 |
| 6,161,653 A * | 12/2000 | Skalski | ..................... | B66B 5/04 187/288 |
| 6,176,350 B1 * | 1/2001 | Schlosser | ................. | B66B 5/20 187/359 |
| 6,425,462 B1 * | 7/2002 | Tran | .......................... | B66B 5/18 187/367 |
| 7,398,863 B2 * | 7/2008 | Liebetrau | ............... | B66B 7/046 187/367 |
| 2004/0262091 A1 * | 12/2004 | Ito | ........................... | B66B 5/185 187/372 |
| 2005/0126862 A1 * | 6/2005 | Ito | ........................... | B66B 5/185 187/350 |
| 2005/0241886 A1 * | 11/2005 | Marti | ....................... | B66B 5/18 187/351 |
| 2006/0180406 A1 * | 8/2006 | Gremaud | .................. | B66B 5/16 187/355 |
| 2006/0266590 A1 * | 11/2006 | Mateo Mur | ............... | B66B 5/22 187/373 |
| 2007/0272500 A1 * | 11/2007 | Gremaud | .................. | B66B 5/16 188/43 |
| 2008/0128218 A1 * | 6/2008 | Gremaud | .................. | B66B 5/22 187/250 |
| 2012/0152663 A1 * | 6/2012 | Legeret | ..................... | B66B 5/20 187/404 |
| 2013/0081907 A1 * | 4/2013 | Meierhans | ................ | B66B 5/20 187/359 |
| 2013/0081908 A1 * | 4/2013 | Meierhans | ................ | B66B 5/18 187/359 |
| 2013/0248298 A1 * | 9/2013 | Osmanbasic | ............. | B66B 5/20 187/359 |
| 2015/0240894 A1 * | 8/2015 | Piech | .................... | F16D 63/008 188/163 |
| 2015/0259175 A1 * | 9/2015 | West | ........................ | B66B 5/18 187/359 |
| 2017/0291793 A1 * | 10/2017 | Bitzi | ........................ | B66B 1/32 |
| 2017/0291794 A1 * | 10/2017 | Bitzi | ........................ | B66B 1/32 |
| 2018/0162694 A1 * | 6/2018 | Hu | .............................. | B66B 5/22 |
| 2019/0062113 A1 * | 2/2019 | Hu | .............................. | B66B 5/22 |

FOREIGN PATENT DOCUMENTS

| | | |
|---|---|---|
| CN | 101456522 A | 6/2009 |
| CN | 202201672 U | 4/2012 |
| EP | 1671912 A1 | 6/2006 |
| EP | 2058262 A1 | 5/2009 |
| JP | H02127379 A | 5/1990 |
| WO | 2008080847 A1 | 7/2008 |
| WO | 2014077813 A1 | 5/2014 |

* cited by examiner

ELEVATOR BRAKE

FIELD

The present invention relates to an elevator brake for braking and holding an elevator car in an elevator system and a correspondingly constituted elevator system.

BACKGROUND

The elevator system is used for the essentially vertical transport of persons or goods over several floors of a building. For this purpose, the elevator system comprises at least one elevator car. This elevator car is guided by means of guide rails and is traversed along these guide rails by means of an elevator machine. The elevator system further comprises at least one elevator brake.

The elevator brake meets various requirements. As a rule, the elevator brake is used as a holding brake, which holds fast the elevator car during a standstill phase. Standstill phases occur when the elevator car is in a holding position and the drive motor is switched off or when the elevator system is out of operation. The elevator brake is also used as an emergency brake for braking and stopping the elevator car in the event of malfunction. Such malfunctions are for example an unexpected actuation of a door of the elevator during travel and also a defect of a critical electronic component, etc. Furthermore, elevator brakes are also used as so-called safety brakes. Safety brakes have for example the function of braking and holding the elevator car in the event of a suspension means being torn.

Depending on the nature of the requirement, the elevator brake must be brought gently into action or, for example in the event of the suspension means tearing, it must be brought very rapidly into action. The required braking power is also different depending on the requirement. For this reason, different brakes are usually incorporated in the elevator. Thus, for example, a usually electromagnetic holding brake is used with the drive together with a safety device on the elevator car. The electromagnetic holding brake is used as a holding and emergency brake and the safety device as a safety brake.

A brake used on the elevator car is known from application EP1671912 which can assume all three braking functions if required.

A further brake is known from European publication EP2058262 which on the one hand enables a controlled adjustment of a release force and which on the other hand enables rapid braking by tripping the release apparatus.

The brakes for elevators with two symmetrical actuating devices are known in the prior art, for example in U.S. Pat. No. 5,791,442, which actuating devices are each assigned to a brake lining and which are designed to move the respectively assigned brake lining towards the other brake lining if necessary and to clamp the braking strip or the brake disc between the two brake linings.

Accordingly, a problem arises of making available an elevator brake which can assume at least the three mentioned braking functions and which can be controlled in a straightforward manner.

SUMMARY

Such an elevator brake is provided for braking and holding an elevator car in an elevator system. In a proposal for a solution, the elevator brake comprises a second and a first brake lining. Between the second and the first brake lining, the elevator brake has a gap for accommodating a braking strip of a guide rail of the elevator car or a brake disc of an elevator drive. The elevator brake comprises a second actuating device, which is designed to move the second brake lining towards the first brake lining if necessary and to clamp and the brake the braking strip or brake disc between the second and first brake lining. The elevator brake further comprises a first actuating device, which is designed to move the first brake lining towards the second brake lining and accordingly to clamp and brake the braking strip or the brake disc between the first and second brake lining.

Basically, the brake thus comprises two functional units, which are actuated essentially independently of one another, can be tested independently, and which in their function are essentially independent of the other functional unit or actuating device. Essentially, this means that at least the function of triggering the brake can take place independently of one another. The two actuating devices operate according to different principles of operation.

This solution has the advantage that the nature of the two actuating devices can be constituted independently of one another. The first and second brake lining or actuating device are of course interchangeable. The designation first and second does not define any sequence in the explanations. The presence of a second part does not for example necessarily require a first part.

According to the proposal for a solution, the second actuating device comprises a second advancing device, which when necessary can advance the second brake lining from a standby position towards the braking strip or the brake disc and press it against the latter, and the second actuating device also comprises a second return device, which can return the second brake lining from the advanced position back into its standby position. The second advancing device and the second return device are preferably formed by an assembly, which is capable of advancing and pressing against the second brake lining and then also returning it again. The second actuating device thus operates according to a second principle of operation, in that the second actuating device comprises an advancing device and a retraction device in order to advance the second brake lining if necessary from a standby position towards the braking strip or the brake disc, to press it against the latter and to return it again.

This is advantageous, since the brake can be activated and also deactivated again in a controlled manner by means of this second actuating device. It is therefore ideally suited as a holding brake and if need be as an emergency brake. The two actuating devices can thus be designed for different braking requirements.

The second advancing device preferably comprises an advancing control, by means of which an advancing force can be controlled or regulated at least in steps. This is advantageous, since the elevator brake can thus be triggered depending on the load status of the elevator car and a corresponding braking requirement.

The second advancing device preferably comprises a spindle drive, and this spindle drive is preferably driven by means of an electric motor. The spindle drive is preferably constituted self-locking, so that it can maintain an advanced position that has been set at the time without the supply of energy.

Electric motors are readily available and the second brake lining can be rapidly advanced and retracted by means of the spindle drive. If necessary, the electric motor can of course be connected to the spindle by means of gearing. The motor itself can thus be kept small. The self-locking design of the spindle drive makes it possible for a set advancing or braking force to be maintained without a further supply of energy.

According to the proposal for a solution, the first actuating device comprises a first advancing device with an energy store, wherein the first advancing device advances the first brake lining towards the braking strip or the brake disc and presses it against the latter when energy stored in the energy store is released. The functioning of the first actuating device therefore consists in the fact that energy is made available which is available on demand and which can rapidly bring the first brake lining into action. The first advancing device can also be referred to as an advancing mechanism, since it preferably or at least predominantly comprises mechanical elements. The first actuating device thus operates according to a first principle of operation that is different from the second principle of operation, in that the first advancing device comprises the energy store which, when the energy stored in the energy store is released, advances the first brake lining towards the braking strip or the brake disc and presses it against the latter.

This is advantageous, since such an embodiment is suitable, for example in the event of a cable break, for being brought into action rapidly and reliably and thus being able to brake rapidly. It should be noted here that, in the event of a cable break, a fall speed of the elevator car increases very quickly. For this reason, the aforementioned embodiment is especially beneficial, since the elevator brake can be brought very rapidly into action by means of the stored energy, for example of a tensioned spring or also a pressure cartridge.

The first actuating device preferably comprises a first return device. The first return device comprises, for example, a tension bolt, which can act at least directly or indirectly on the energy store of the first advancing device. This tension bolt can be actuated, in one embodiment, either actively by means of a pneumatic, hydraulic or electromotive or magnetic lifting means or, alternatively in a simple embodiment, it can be actuated manually by means of a tension lever. In this embodiment, the energy store together with the associated first advancing device and the first brake lining can at all events be pushed back by means of the tension bolt into its tensioned standby position.

This is advantageous, since a suitable return of the first actuating device can be arranged depending on the comfort demands. It should be noted here that a cable break in an elevator system is actually never needed and that this function of the elevator brake accordingly represents a "worst-case" safety arrangement corresponding to a life jacket in an aircraft. Accordingly, a corresponding manual effort can as a rule be accepted for a return of this first actuating device. This rapid functioning of the elevator brake, however, is also sometimes used in the case of another requirement—overloading, overrunning a holding point, service operation. For this purpose, remotely resettable first return devices using the aforementioned exemplary pneumatic, hydraulic, electromotive or magnetic lifting means are then useful.

The first advancing device of the first actuating device preferably comprises a preferably electromagnetic holding or catch device, which can hold the energy store in the loaded state and release it if necessary.

This is advantageous, since a holding and catch device by means of a catch is ideally suited for holding an arrangement with little force and releasing it rapidly when necessary. A use of electromagnets for holding or releasing the catch is a tried and tested and cost-effective solution. An active retention (failsafe) or a passive retention is feasible. In the case of an active retention, the energized electromagnet holds the catch in engagement and, when the energization is discontinued, the catch releases the energy store. This is advantageous, since the catch is automatically released when the electrical supply is discontinued or in the event of a wire break, etc. In the case of a passive retention, the catch is engaged with a non-energized electromagnet and, for release of the catch, the electromagnet is energized at least briefly in order to release the catch. This variant can be operated with little electrical energy, but special measures have to be taken in order that, for example in the event of a defect of a magnet, this can be ascertained and suitable measures can be taken.

The energy store of the first advancing device preferably comprises a spring accumulator and the first brake lining or a corresponding brake housing is constituted in such a way that the first brake lining in its standby position lies essentially adjacent to a stop, so that a tensioning force brought about by the second actuating device via the second brake lining can be transferred via the stop into a brake housing of the elevator brake. In the case of braking initiated by the second actuating device, the first actuating device is not therefore loaded. Accordingly, it can be designed for a small number of load cycles.

The second advancing device of the second brake lining is preferably constituted such that it can push the first brake lining—after actuation thereof—together with the associated advancing mechanism and the energy store back into its tensioned standby position and that it can thus return the first brake lining. After a rapid actuation of the elevator brake by means of the first actuating device, the latter and the associated first advancing device can thus be pushed back into the tensioned standby position. A special additional device for returning the first actuating device can thus be dispensed with. After the first actuating device has been pushed back, the catch merely has to be activated in order to hold the first actuating device.

In an alternative embodiment, the preferably electromagnetic holding and catch device comprises a plurality of electromagnets, which can act on the tension bolt and therefore directly or indirectly on the energy store of the first advancing device by means of a lever transmission. A plurality of electromagnets permits the use of smaller magnets. This can be cost-effective and provides more flexibility in the arrangement thereof. A failure of an individual one of the magnets, for example, can thus also be compensated for. Such an electromagnetic holding and catch device can of course be used not only for the previously described elevator brake, but can also be used for different kinds of elevator brakes.

In an additional embodiment, the plurality of electromagnets are designed to move the tension bolt and the energy store from an actuated position, in which the first brake lining is advanced towards the braking strip or the brake disc, back into its tensioned standby position and thus to return the first brake lining. This of course requires a design of the electromagnets for a higher capacity, since effective tensioning work must be performed, although the magnets that are in any case present can be used.

A partial quantity of the plurality of electromagnets is advantageously designed to hold the tension bolt and the energy store in its tensioned standby position and thus to hold the first brake lining at a predetermined or adjustable distance from the braking strip or the brake disc. The partial quantity of the plurality of electromagnets advantageously comprises a predetermined number of electromagnets, wherein this number can be a single one of this plurality of electromagnets, but also several thereof. In any event, the partial quantity does not include all of the plurality of electromagnets. The partial quantity does not of course always have to be the same. The partial quantity can be varied, so that testing of the capacity is enabled.

In any event, all the magnets can be activated for the return of the first actuating device in the order to generate a correspondingly large tensioning force, while only a few or even only one—i.e. the partial quantity—of the plurality of electromagnets then suffices for the holding. The magnet or magnets are advantageously different. The magnets required for the tensioning, for example, are thus constituted as a lifting or linear magnet and the magnets used for the holding are constituted as a magnetic clamp. This has the advantage that much tensioning work can be performed by means of the lifting magnets, while the magnetic clamps can be operated with little electrical energy for the holding.

In a variant of embodiment, the electromagnetic holding or catch device comprises a traction means, which can hold the first brake lining in its tensioned standby position, and this traction means is placed around a bollard or a capstan or looped around the latter. A free end of the traction means is held by means of the at least one electromagnet. A holding force of the electromagnet can thus be minimized.

As described in the previous variations, the elevator brake is advantageously arranged on the elevator car. The elevator car is guided along guide rails and the elevator brake is arranged in such a way that the braking strip, which preferably also corresponds to a guide strip of the guide rail, is arranged in the intermediate space between the second and the first brake lining of the elevator brake. At least two elevator brakes are advantageously arranged on the elevator car, so that they are each able to interact with one of two guide rails arranged on both sides of the elevator car. Loading can thus be distributed symmetrically.

The elevator brake advantageously comprises a centering device, which centers the non-actuated elevator brake in a non-actuated position, so that the second and the first brake lining are arranged at a predetermined or adjustable distance from the guide rail. Furthermore, the elevator brake is advantageously fixed laterally displaceable to the elevator car, so that it can be aligned with respect to the guide rail under the effect of a contact pressure generated by the second and/or first actuating device of the elevator brake. Transverse forces on the car and the rail system can thus be minimized.

The elevator system usually comprises an elevator control for controlling the elevator in the normal operation. Furthermore, the elevator system advantageously also comprises a monitoring device for monitoring correct operation of the elevator system. The elevator control preferably triggers solely the second actuating device of the elevator brake in the normal operation and the monitoring device actuates the first actuating device when a malfunction is ascertained. As a rule, the monitoring device, when it ascertains a malfunction, also initiates the second actuating device in the sense of a failsafe system, irrespective of whether the latter has already been actuated by the elevator control. The actuation of the elevator brake naturally has priority in any case. This means that, as soon as either the elevator control or the monitoring device triggers the elevator brake for closing, i.e. for braking, a braking request occurs. Dependent on the nature of the malfunction, the monitoring device may for example trigger only the second actuating device in a first action in order to activate the elevator brake or the second actuating device, and then, if an expected braking of the elevator is absent, it can also activate the first actuating device in a subsequent action. A reaction of the elevator system to a malfunction of the installation that is appropriate to the malfunction can thus take place.

DESCRIPTION OF THE DRAWINGS

The invention is explained in greater detail below with the aid of examples of embodiment in connection with the appended figures. In the figures:

FIG. 5c shows a magnet arrangement for the electromagnetic holding and catch device from FIG. 5a;

DETAILED DESCRIPTION

Figures 1, 2:
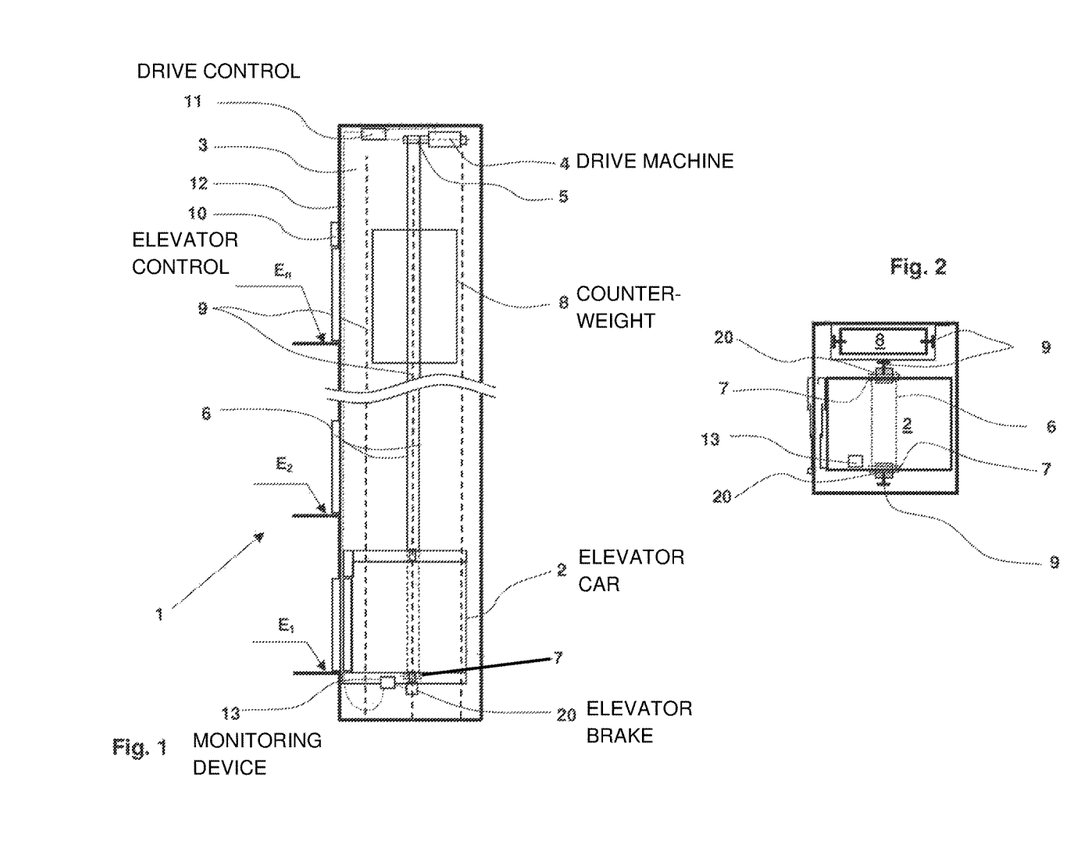
FIG. 1 shows a diagrammatic side view of an exemplary elevator system.
FIG. 2 shows a cross-section of the elevator system from FIG. 1.

An elevator shaft 3 of an elevator system 1 is represented diagrammatically in FIG. 1. Elevator system 1 comprises an elevator car 2, which is at a floor $E_1$. Further floors of elevator shaft 3 are represented by $E_2$ to $E_n$. Elevator system 1 of FIG. 1 is constituted as a traction elevator system with a counterweight 8, wherein suspension means 6 connect and carry elevator car 2 and counterweight 8. Suspension means 6 are passed beneath elevator car 2 by means of support rollers 7 and are driven as required by a drive pulley 5 of a drive machine 4. Cables or belts are normally used as suspension means 6. An elevator control 10 ascertains and controls elevator system 1. It transmits necessary travel commands to a drive control 11 and drive control 11 correspondingly controls drive machine 4.

Also present in elevator shaft 3 are guide rails 9 for elevator car 2 and counterweight 8, which serve to guide and stabilize elevator car 2 and counterweight 8. Elevator car 2 is provided with an elevator brake 20, which is located beneath elevator car 2.

FIG. 2 shows elevator system 1 diagrammatically from above. Guide rails 9, which guide elevator car 2 and counterweight 8 in each case in pairs, can clearly be seen.

In this example of embodiment, two elevator brakes 20 are arranged laterally beneath elevator car 2. The two elevator brakes 20 interact respectively with a guide rail 9 for braking and holding elevator car 2. Guide rail 9 comprises a braking strip 9a (FIG. 3) which is designed to interact with the elevator brake. Elevator brakes 20 are constituted as a holding, emergency and safety brake. A separate safety device is not provided. Elevator brake 20 is controlled on the one hand by elevator control 10 during normal operation. It triggers the elevator brake in order to hold elevator car 2 when elevator car 2 is at a floor $E_1$ to $E_n$ for example or it initiates emergency braking, if for example a door is opened unexpectedly or if another malfunction is ascertained. A monitoring device 13 is also located on elevator car 2. This monitoring device monitors the course of the movement of elevator car 2 and it triggers elevator brake 20 if for example a suspension means 6 breaks. The control units such as elevator control 10, drive control 11, monitoring device 13 and required sensors, switches and further control devices are connected to one another by signal lines 12 or bus systems. The various controls can of course also be combined to form common controls.

Figure 3:
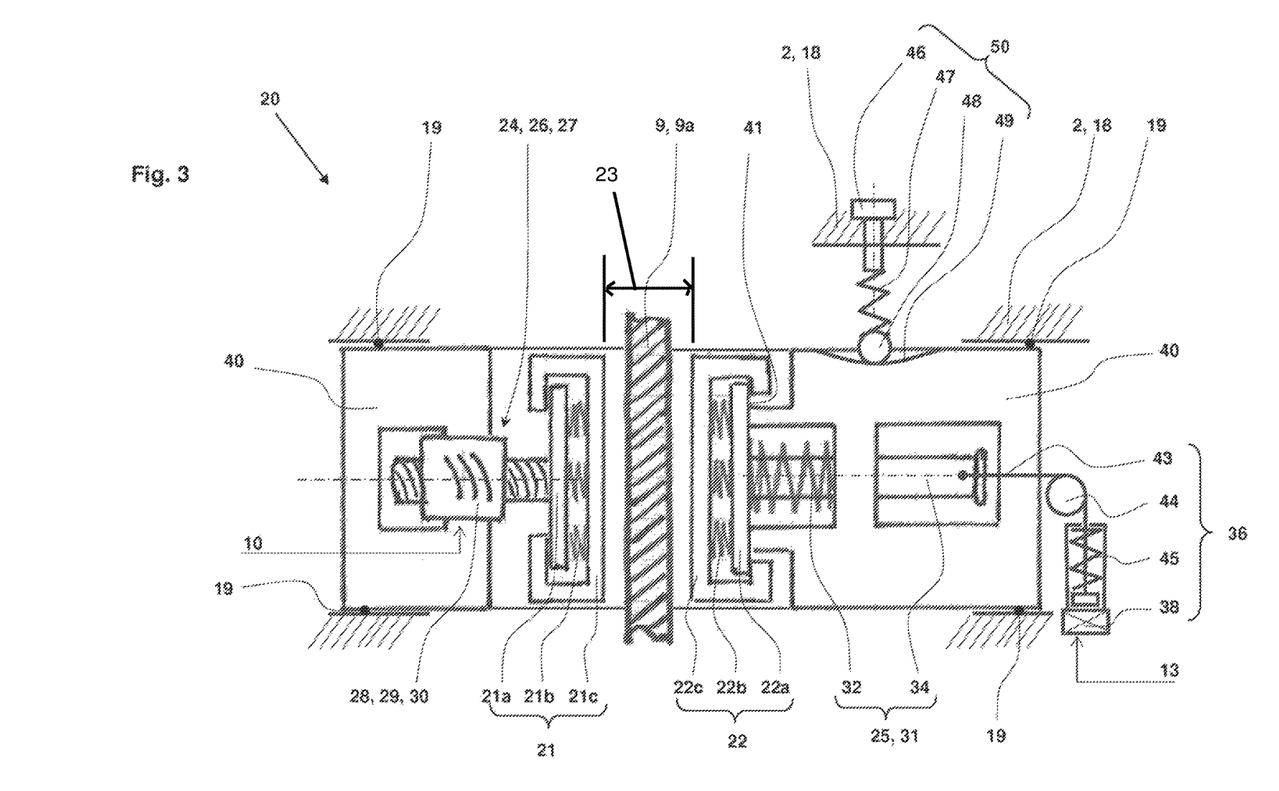
FIG. 3 shows a schematic representation of a first embodiment of an elevator brake.

FIG. 3 shows an embodiment of an elevator brake 20, such as can be used in the previously described elevator system. Elevator brake 20 for braking and holding an elevator car in an elevator system comprises a second brake lining 21 and a first brake lining 22. Brake linings 21, 22 are arranged in a brake housing 40 of elevator brake 20. A spacing 23 between the two brake linings 21, 22 is adjusted such that braking strip 9a of guide rail 9 can be arranged between the latter, so that the braking strip is not clamped in the non-actuated position of elevator brake 20. The non-actuated position of the elevator brake is also referred to as a standby position. Spacing 23 corresponds to a width of braking strip 9a plus a passage clearance of approx. 2 times 1.5 to 3 millimeters. In this standby position, the elevator car can be traversed by the drive machine unhindered.

The two brake linings 21, 22 are constituted multi-part in the example of embodiment. They each comprise a pressure plate 21a, 22a, an elastic interlayer 21b, 22b and a friction lining 21c, 22c. An impact noise of brake linings 21, 22 on braking strip 9a, for example, can be reduced by means of the elastic interlayer. A plastic insert, a spring arrangement or for example an inserted rubber ring/O-ring can be used as elastic interlayer 21b, 22b. In the example, both brake linings 21, 22 are constituted multi-part. Only one of the two brake linings 21, 22, for example second brake lining 21, can of course also be constituted multi-part.

Second brake lining 21 is arranged and mobile in brake housing 40 by means of a second actuating device 24. Second actuating device 24 operates according to a second principle of operation and, in the example of embodiment, is constituted as second advancing device 26 and at the same time as second return device 27. By means of an electric motor 30, which drives a spindle drive 29, second brake lining 21 is advanced if necessary by means of an advancing control 28 and also returned again. Electric motor 30 can act on spindle drive 29 directly or by means of gearing.

First brake lining 22 is arranged and mobile in brake housing 40 by means of a first actuating device 25. First actuating device 25 operates according to a first principle of operation and, in the example of embodiment, comprises a first advancing device 31. First advancing device 31 essentially comprises an energy store 32, for example in the form of a compression spring. Energy store 32 is held in a standby position via a tension bolt 34 by means of a holding and catch device 36. In the represented example, holding and catch device 36 comprises a traction means 43, which is connected to the tension bolt and which is held by an electromagnet 38. In the energized state, electromagnet 38 can thus hold the first brake lining in its standby position. As soon as the energization of the electromagnet is removed, energy store 32 presses against the brake lining and thus firmly clamps braking strip 9a. In order to keep a holding force of electromagnet 38 small, traction means 43 is passed around a bollard or capstan 44. The holding force of electromagnet 38 is thus increased corresponding to the Euler-Eytelwein belt friction formula, in order to make available sufficient tensioning force for holding the energy store.

A centering device 50 holds brake housing 40 with unloaded brake linings in a central position. This central position is adjusted such that the two brake linings 21, 22 in the unloaded state, or when the brake linings are in their standby position, are positioned symmetrically at a distance from braking strip 9a. For this purpose, brake housing 40 can be fixed to elevator car 2 laterally displaceable by means of receiving elements 18. For this purpose, receiving element 18 are provided with sliding surfaces 19. Receiving elements 18 can of course also be made in another design by means of slide bolts, on which the brake housing is mounted laterally displaceable. In the example, the brake housing comprises a spherical depression or centering trough 49. A centering sphere 48 is pressed into centering trough 49 by means of a centering spring 47, which is pretensioned by means of a set screw 46 stationary with respect to elevator car 2 or receiving element 18. A lateral displacement of the entire brake housing 40 is thus enabled and at the same time the brake housing is centered in its central position in a force-free state.

For holding the elevator car during normal operation or also when emergency braking is required, elevator control 10 triggers second advancing device 26 of second actuating device 24. Electric motor 30 moves, by means of spindle drive 29, second brake lining 21 in the direction of braking strip 9a. As soon as the second brake lining presses against braking strip 9a, brake housing 40 is pushed back in the direction of second actuating device 24 (to the left in FIG. 3), as a result of which first brake lining 22 is also brought into contact with braking strip 9a. By a further rotation of electric motor 30, a pressing force and corresponding braking force is finally produced and the elevator car is correspondingly retarded or held at a standstill. Spindle drive 29 is preferably constituted with a small screw pitch, so that a selected contact pressure position is maintained without further supply of energy.

For the return of elevator brake 20, electric motor 30 is reversed by means of second return device 27, until the brake linings again release braking strip 9a. Centering device 50 accordingly returns brake housing 40 back into its central position.

In order to catch the elevator car, if for example the elevator car is threatening to fall or if an unexpectedly high travel speed is ascertained, monitoring device 13 triggers first advancing device 31 of first actuating device 25. Electromagnet 38 is thereby de-energized and the energy store abruptly or very rapidly advances first brake lining 22 of the elevator brake. As soon as first brake lining 22 is pressed against braking strip 9a, brake housing 40 is pushed back in the direction of first actuating device 25 (to the right in FIG. 3), as a result of which second brake lining 21 is also brought into contact with braking strip 9a. Braking strip 9a is then clamped corresponding to a set pressing force of energy store 32 and braking of the elevator car takes place.

Second actuating device 24 is used to return elevator brake 20. Second advancing device 26 is triggered in order to push back first brake lining 22 until brake lining 22 lies adjacent to a stop 41 of brake housing 40 and energy store 32 is tensioned again. Counter-spring 45 of holding or catch device 36 presses a counter-plate of electromagnet 38 towards electromagnet 38. Once the latter has been switched on, second actuating device 24 together with second brake lining 22 can be traversed back and the elevator brake is back in its standby position.

Figure 7:
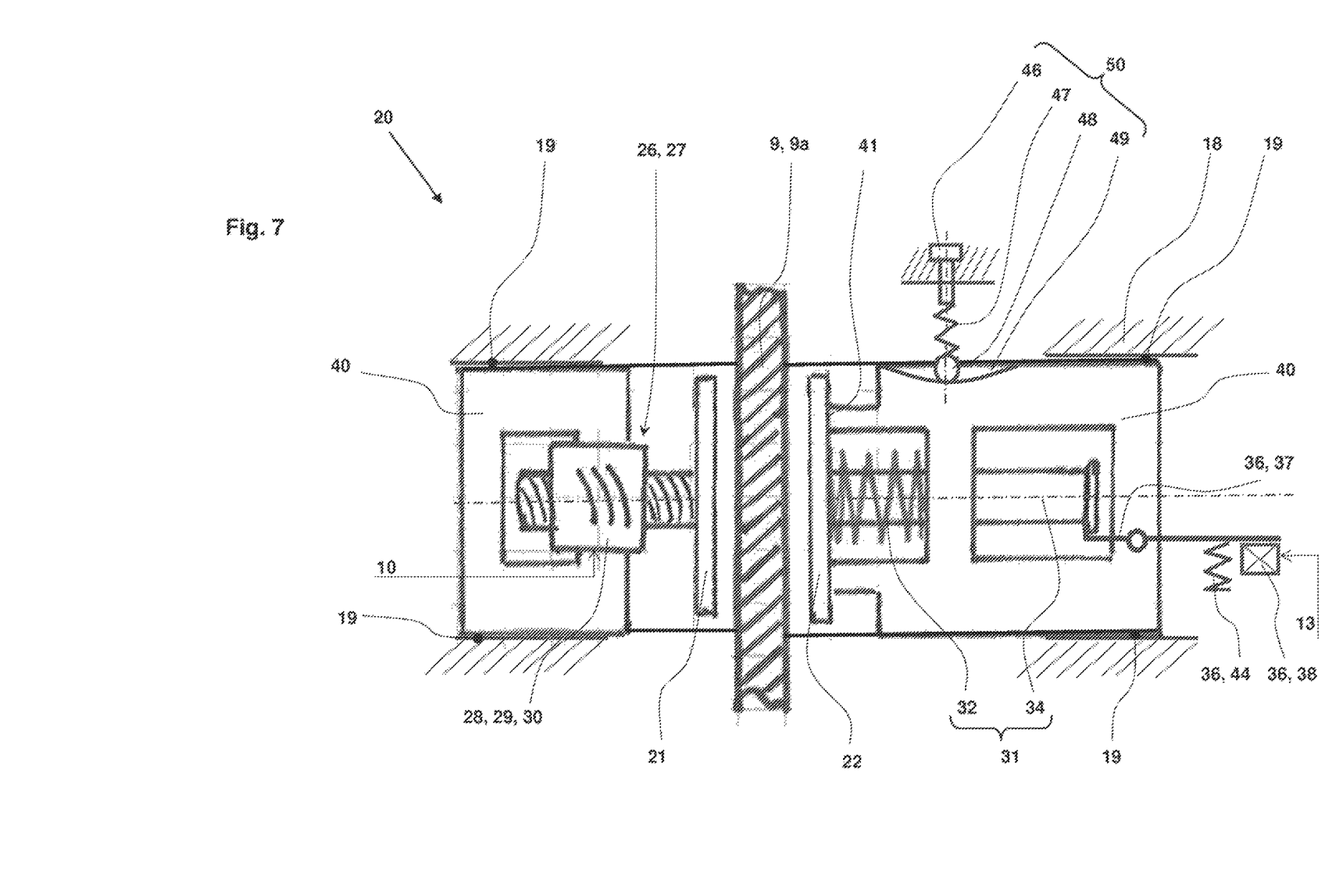
FIG. 7 shows a schematic representation of a further embodiment of an elevator brake.

FIG. 7 shows another embodiment of an elevator brake 20, such as can be used in the elevator system described at the outset. In contrast with the embodiment of FIG. 3, second and first brake linings 21, 22 are each constituted in one part. Brake housing 40 is, as already explained, guided sliding in receiving elements 18 and the brake housing is aligned centrally with braking strip 9a by means of centering device 50. Holding and catch device 36 is constituted by means of a catch 37. Catch 37 is held at one end by means of electromagnet 38 and at the other end holds back tension bolt 34.

Figures 8, 9:
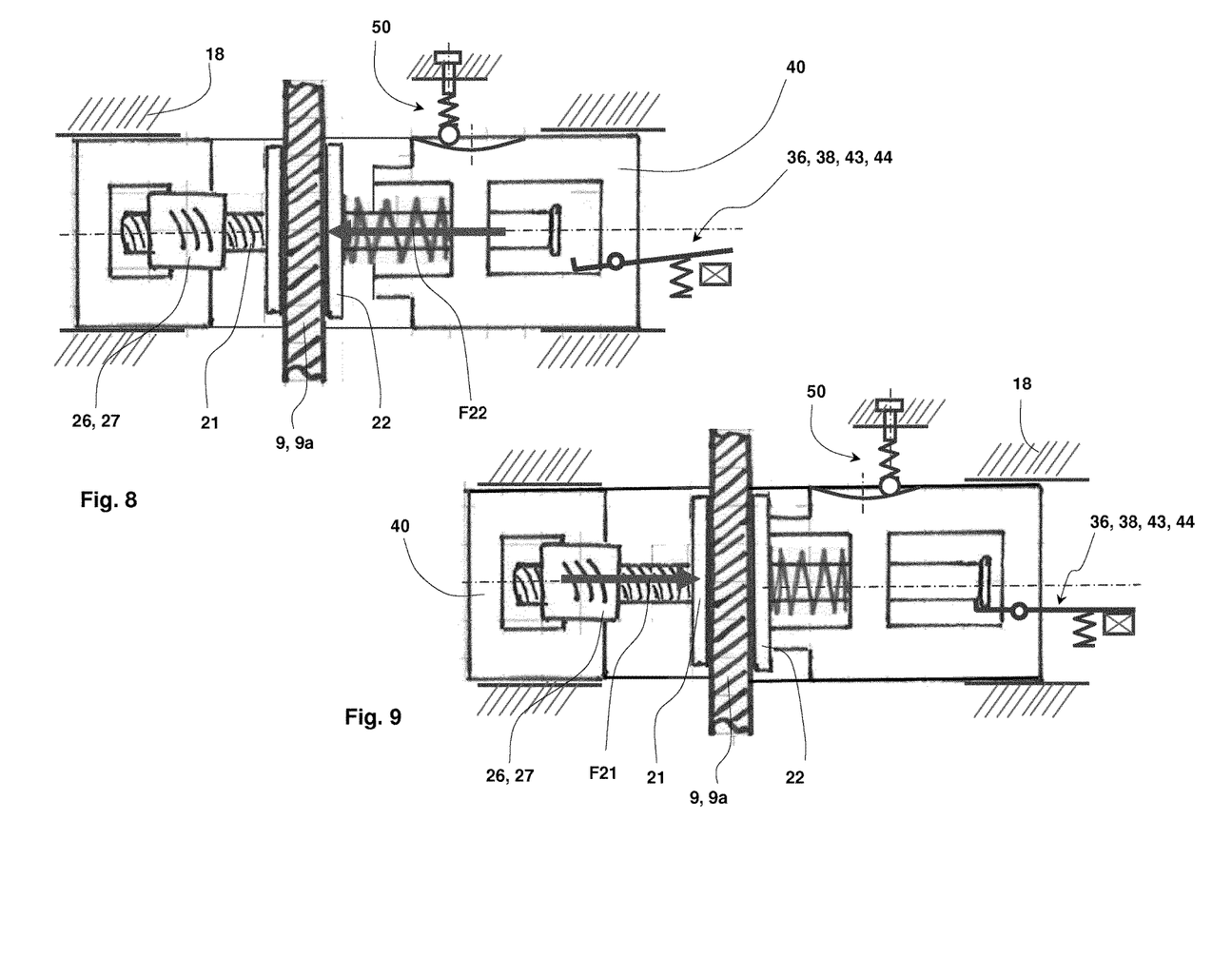
FIG. 8 shows the elevator brake from FIG. 7 with an actuated first actuating device.
FIG. 9 shows the elevator brake from FIG. 7 with an actuated second actuating device.

For catching of the elevator car, electromagnet 38 releases catch 37 and therefore tension bolt 34 and energy store 32. As already explained in connection with FIG. 3, first brake lining 22 is thus pressed against braking strip 9a with a pressing force F22 predetermined by means of energy store 32, the brake housing is displaced laterally, as a result of which braking strip 9a is finally clamped and braked. This state is represented in FIG. 8.

For holding of elevator car during normal operation also when emergency braking is required, elevator control 10 triggers second advancing device 26 of second actuating device 24, as already explained in connection with FIG. 3. A pressing force F21 and the corresponding braking force is finally produced by electric drive 30 via spindle drive 29, independently of first actuating device 25, and the elevator car is correspondingly retarded or held at a standstill. This state is represented in FIG. 9. The same working position, as represented in FIG. 9, is of course also established when, after actuation by means of the first actuating device, elevator brake 20 is returned by the second actuating device.

Figure 4A:
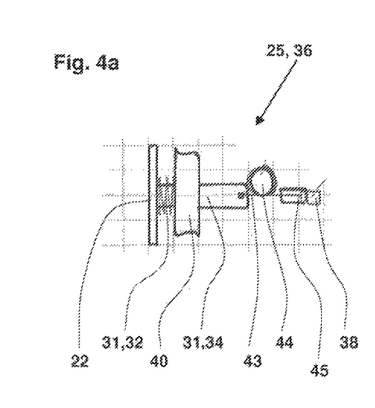
FIG. 4a shows a diagrammatic representation of a possible first advancing device for the first actuating device in a tensioned standby position.
Figure 4B:
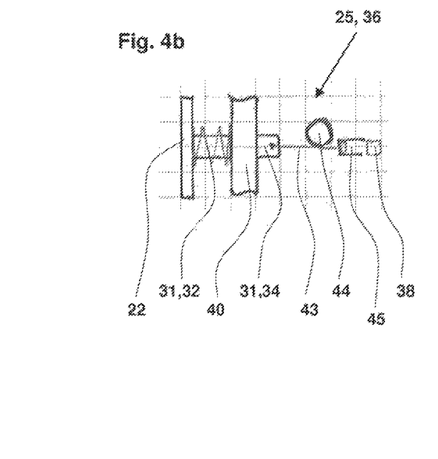
FIG. 4b shows the first advancing device from FIG. 4a in an actuated position.

Holding and catch device 36 of first actuating device 25 can, as explained in respect of FIG. 3, be optimized with the aid of a bollard or a capstan. In the standby position of elevator brake 20, electromagnetic 38 holds traction means 43 fast. The traction means is for example wound twice (720°) around the capstan. A retention force of approx. 13 kilo-Newton (of approx. 0.4 in the case of a capstan friction value) can thus be achieved by means of an electromagnetic clamp 38 with approx. 250 Newton holding force. If electromagnet 38 is de-energized, as shown in FIG. 4b, the tensioned energy store can rapidly advance brake lining 22. Traction means 43 is held under tension by means of small counter-spring 45, so that the counter-plate of electromagnet 38, during the return, is brought back into contact with the electromagnet.

Figure 5A:
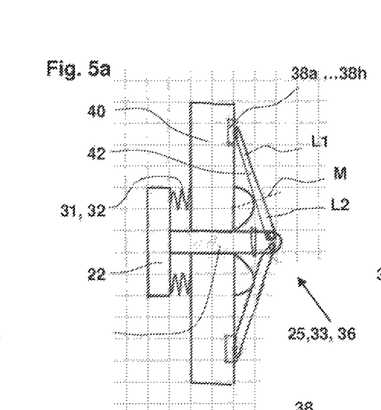
FIG. 5a shows a diagrammatic representation of an electromagnetic holding and catch device for the first actuating device in a tensioned standby position.
Figure 5B:
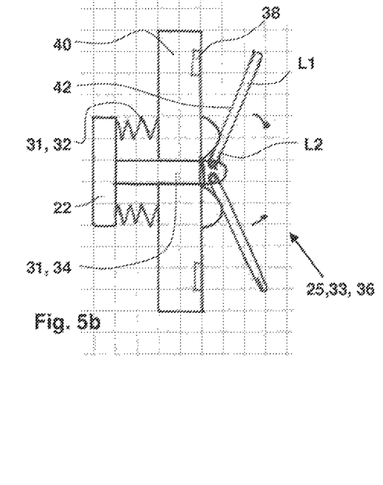
FIG. 5b shows the electromagnetic holding and catch device from FIG. 5a in an actuated position.
Figure 5C:
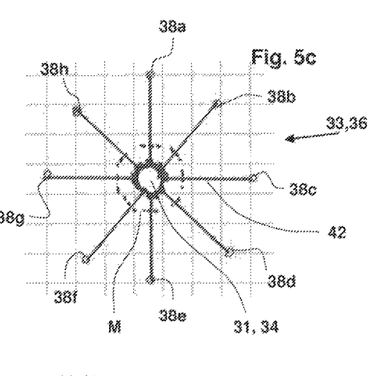

FIGS. 5a to 5c represent a further alternative for holding and catch device 36. Brake plate 22 is tensioned in FIG. 5a by means of energy store 32 of first advancing device 31. Brake plate 22 is held by tension bolt 34. Tension bolt 34 is held by electromagnet 38 by means of a lever 42 via a fulcrum M. Fulcrum M defines the magnetic forces required by the resultant lever distribution L1/L2 of lever 42. As can be seen in FIG. 5c, electromagnet 38 is a plurality of electromagnets 38a to 38h, i.e. in the example eight partial magnets. Electromagnets 38a to 38h are arranged star-shaped around tension bolt 34 and each of electromagnets 38a to 38h engages via its own lever 42 with the tension bolt. Low-cost small magnets can thus be used. At all events, a partial quantity of electromagnets 38 suffices to hold the elevator brake in the standby position, whereas all the electromagnets are switched on for the return. In the example of embodiment, the partial quantity of electromagnets could mean that two electromagnets 38d, 38h suffice to hold the elevator brake in the standby position. In the case of a de-energization of electromagnets 38a-38h, tension bolt 34 with brake lining 22 is pushed into its working position by energy store 32, as can be seen in FIG. 5b.

Figure 6:
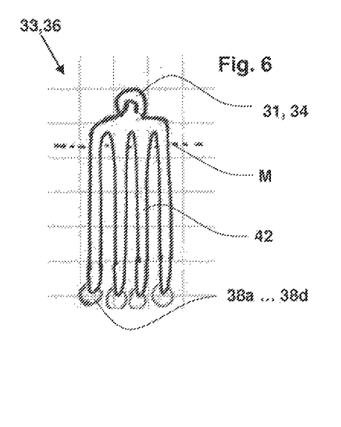
FIG. 6 shows another magnet arrangement for the electromagnetic holding and catch device.

Instead of the star-shaped arrangement of the electromagnets, as mentioned previously, the electromagnets can also be arranged in parallel and can act on the tension bolt via a common lever arrangement 42, as represented in FIG. 6. Combinations of the solutions are of course also possible. Thus, for example, in the case of the star-shaped arrangement of FIG. 5c, a plurality of double levers 42 can also be used, so that for example eight times two electromagnets can act on the tension bolt.

In one embodiment, electromagnets 38a to 38h are constituted by different design forms. Thus, in one variant, six of the eight electromagnets 38a to 38h, for example electromagnets 38a, 38b, 38c, 38e, 38f, 38g, are constituted as lifting magnets. The lifting magnets produce, by a linear motion, a lifting or tractive force and they can thus tension energy store 32. The partial quantity of two remaining electromagnets 38d, 38h are constituted as magnetic clamps. They are capable of holding energy store 32 in its tensioned position. The lifting magnets can thus be switched off after the tensioning. The exemplary embodiment with eight electromagnets can of course be varied by the person skilled in the art according to required forces, taking account of installation space and cost.

Further combinations and modifications are possible. Thus, the elevator brake shown can of course also be fitted as a brake on a drive of a conveyor belt or an elevator.

Furthermore, the second actuating device can also comprise hydraulic or pneumatic elements in place of the spindle drive described by way of example or the first actuating device can if need be also comprise a pyrotechnic actuator. In any event, the two actuating devices are capable, independently of one another, of triggering a braking operation.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator brake for braking and holding an elevator car in an elevator system, the elevator brake comprising:
a first brake lining with a first actuating device and a second brake lining with a second actuating device, wherein the first brake lining and the second brake lining are arranged at a predetermined distance from one another in a standby position so that a braking strip of a guide rail for the elevator car or a brake disc of an elevator drive for the elevator car can be arranged between the first brake lining and the second brake lining;
wherein the second actuating device moves the second brake lining towards the first brake lining to clamp and brake the braking strip or the brake disc between the first brake lining and the second brake lining;
wherein the first actuating device moves the first brake lining towards the second brake lining to clamp and brake the braking strip or the brake disc between the first brake lining and second brake lining; and
wherein the first actuating device is operated according to a first principle of operation and the second actuating device is operated according to a second principle of operation, the second principle of operation being different from the first principle of operation.

2. The elevator brake according to claim 1 wherein according to the first principle of operation, the first actuating device includes a first advancing device with an energy store, wherein the first advancing device advances the first brake lining from the standby position towards the braking strip or the brake disc and presses the first brake lining against the braking strip or the brake disc when energy stored in the energy store is released, and according to the second principle of operation, the second actuating device includes a second advancing device that advances the second brake lining from the standby position towards the braking strip or the brake disc and presses the second brake lining against the braking strip or the brake disc, and the second actuating device further includes a return device that returns the second brake lining into the standby position.

3. The elevator brake according to claim 2 wherein the second advancing device includes an advancing control by which an advancing force applied by the second advancing device to advance the second brake lining is controlled.

4. The elevator brake according to claim 2 wherein the second advancing device includes a spindle drive driven by an electric motor, wherein the spindle drive is self-locking to maintain an advanced position without a supply of electrical energy to the electric motor.

5. The elevator brake according to claim 2 wherein the first actuating device includes a tension bolt that acts directly or indirectly on the energy store of the first advancing device and the tension bolt is actuated to return the energy store together with the first advancing device and the first brake lining to the standby position.

6. The elevator brake according to claim 5 wherein the first advancing device of the first actuating device includes an electromagnetic holding and catch device that holds the energy store in the standby position and is operated to release the energy store.

7. The elevator brake according to claim 6 wherein the electromagnetic holding and catch device includes a plurality of electromagnets that act on the tension bolt through a lever distribution and act directly or indirectly on the energy store of the first advancing device.

8. The elevator brake according to claim 7 wherein the plurality of electromagnets move the tension bolt and the energy store from an actuated position, in which the first brake lining is advanced towards the braking strip or the brake disc, back to the standby position.

9. The elevator brake according to claim 8 wherein a partial quantity of the plurality of electromagnets holds the tension bolt and the energy store in the standby position and thereby holds the first brake lining at a predetermined or adjustable distance from the braking strip or the brake disc.

10. The elevator brake according to claim 2 wherein the energy store of the first advancing device includes a compression spring and the first brake lining in the standby position lies adjacent to a stop so that a tensioning force brought about by the second actuating device via the second brake lining is transferred via the stop into a brake housing of the elevator brake.

11. The elevator brake according to claim 2 wherein the second advancing device of the second brake lining is actuated to push the first brake lining together with the first advancing device and the energy store back to the standby position.

12. The elevator brake according to claim 1 including a traction means holding the first brake lining in the standby position, the traction means being looped around a bollard or a capstan and, via a free end of the traction means, held by at least one electromagnet.

13. An elevator system with an elevator car that traverses along a guide rail, comprising:
at least one elevator brake fixed to the elevator car for acting on a braking strip arranged on the guide rail, the at least one elevator brake comprising:
a first brake lining with a first actuating device and a second brake lining with a second actuating device, wherein the first brake lining and the second brake lining are spaced apart in a standby position so that the braking strip of the guide rail is arranged between the first brake lining and the second brake lining;
wherein the second actuating device moves the second brake lining towards the first brake lining to clamp and brake the braking strip or the brake disc between the first brake lining and the second brake lining;
wherein the first actuating device moves the first brake lining towards the second brake lining to clamp and brake the braking strip or the brake disc between the first brake lining and second brake lining; and
wherein the first actuating device is operated according to a first principle of operation and the second actuating device is operated according to a second principle of operation, the second principle of operation being different from the first principle of operation.

14. The elevator system according to claim 13 wherein the elevator brake includes a centering device that centers the elevator brake in a standby position wherein the first brake lining and the second brake lining are arranged at a predetermined or adjustable distance from the braking strip, and wherein the elevator brake is fixed laterally displaceable to the elevator car so that the elevator brake is aligned with respect to the guide rail by a contact pressure generated by at least one of the second actuating device and the first actuating device.

15. The elevator system according to claim 13 including an elevator control for controlling the elevator system and a monitoring device for monitoring operation of the elevator system, wherein the elevator control triggers solely the second actuating device of the elevator brake during a normal operation of the elevator system and the monitoring device triggers at least one of the second actuating device and the first actuating device in response to a malfunction of the elevator system.

\* \* \* \* \*